United States Patent
Chen et al.

(10) Patent No.: US 8,402,539 B1
(45) Date of Patent: Mar. 19, 2013

(54) SYSTEMS AND METHODS FOR DETECTING MALWARE

(75) Inventors: Joseph Chen, Los Angeles, CA (US); Adam Glick, Culver City, CA (US); Jeffrey Wilhelm, Venice, CA (US)

(73) Assignee: Symantec Corporation, Mountain View, CA (US)

( * ) Notice: Subject to any disclaimer, the term of this patent is extended or adjusted under 35 U.S.C. 154(b) by 19 days.

(21) Appl. No.: 13/227,997

(22) Filed: Sep. 8, 2011

(51) Int. Cl.
*H04L 29/06* (2006.01)
*G06F 15/16* (2006.01)
*G06F 11/30* (2006.01)

(52) U.S. Cl. .......................... 726/22; 709/227
(58) Field of Classification Search .................. None
See application file for complete search history.

(56) References Cited

U.S. PATENT DOCUMENTS

| | | | |
|---|---|---|---|
| 7,363,657 B2 * | 4/2008 | Caccavale | 726/24 |
| 8,099,596 B1 * | 1/2012 | Rusakov et al. | 713/164 |
| 8,166,544 B2 * | 4/2012 | Memon et al. | 726/23 |
| 8,239,947 B1 * | 8/2012 | Glick et al. | 726/24 |
| 2008/0040800 A1 * | 2/2008 | Park | 726/22 |
| 2011/0239298 A1 * | 9/2011 | Burtscher | 726/23 |
| 2011/0283358 A1 * | 11/2011 | Cochin et al. | 726/23 |
| 2011/0320617 A1 * | 12/2011 | Annamalaisami et al. | 709/228 |

* cited by examiner

*Primary Examiner* — Christopher Revak
(74) *Attorney, Agent, or Firm* — Advantedge Law Group

(57) ABSTRACT

A method for detecting malware may include 1) receiving a request to determine whether a connection from a client device to a server is being blocked, 2) attempting to connect to the server from a kernel mode of the client device, 3) determining that the client device successfully connected to the server from the kernel mode, 4) attempting to connect to the server from a user mode of the client device, 5) determining that the client device did not successfully connect to the server from the user mode, 6) determining, based on the client device successfully connecting to the server from the kernel mode and failing to connect to the server from the user mode, that malware is blocking the connection from the client device to the server, and 7) in response to determining that the malware is blocking the connection, performing at least one security action.

20 Claims, 6 Drawing Sheets

SYSTEMS AND METHODS FOR DETECTING MALWARE

BACKGROUND

Some malware may attack anti-virus systems by preventing an anti-virus agent on a client device from connecting with an anti-virus server. By doing so, such malware may reduce the effectiveness of the anti-virus system by preventing the anti-virus agent from receiving malware signature updates, by preventing the anti-virus server from providing remedies for malware problems on the client, and/or by preventing any other type of communication between the anti-virus server and the client. Traditional anti-virus solutions may have difficulty detecting malware that blocks connections between a client and an anti-virus server because such solutions may be unable to distinguish a situation where malware blocks a connection from a situation where the client or the anti-virus server is legitimately off-line or otherwise lacks network connectivity. What is needed, therefore, is a more effective mechanism for determining whether a connection between a client and a server is being blocked.

SUMMARY

As will be described in greater detail below, the instant disclosure generally relates to systems and methods for detecting malware. For example, a computer-implemented method for detecting malware may include: 1) receiving a request to determine whether a connection from a client device to a server is being blocked; 2) attempting to connect to the server from a kernel mode of the client device, the kernel mode of the client device providing kernel-level privileges to resources of the client device; 3) determining that the client device successfully connected to the server from the kernel mode; 4) attempting to connect to the server from a user mode of the client device, the user mode of the client device providing user-level privileges to the resources of the client device, the user-level privileges being more limited than the kernel-level privileges; 5) determining that the client device did not successfully connect to the server from the user mode; 6) determining, based on the client device successfully connecting to the server from the kernel mode and failing to connect to the server from the user mode, that malware is blocking the connection from the client device to the server; and 7) in response to determining that the malware is blocking the connection from the client device to the server, performing at least one security action.

In some embodiments, the kernel mode of the client device may provide direct access to random access memory of the client device, and the user mode of the client device provide virtual access, instead of direct access, to the random access memory of the client device. According to certain embodiments, attempting to connect to the server from the kernel mode of the client device may include calling a kernel-mode network driver of the client device. Additionally or alternatively, the method may include, after attempting to connect to the server from the kernel mode of the client device and before attempting to connect to the server from the user mode of the client device, switching the client device from the kernel mode to the user mode.

According to various embodiments, determining that the malware is blocking the connection from the client device to the server may include determining that the malware is running in the user mode and is blocking attempts to connect to the server via the user mode. In at least one embodiment, performing the security action may include removing the malware from the client device.

In certain embodiments, the server may include an anti-virus system backend, and the client device may include an anti-virus agent that communicates with the anti-virus system backend to protect the client device from viruses.

According to various embodiments, a system for detecting malware may include: 1) a management module programmed to receive a request to determine whether a connection from a client device to a server is being blocked; 2) a kernel-mode communication module programmed to attempt to connect to the server from a kernel mode of the client device, the kernel mode of the client device providing kernel-level privileges to resources of the client device; 3) a user-mode communication module programmed to attempt to connect to the server from a user mode of the client device, the user mode of the client device providing user-level privileges to the resources of the client device, the user level privileges being more limited than the kernel-level privileges; 4) a determination module programmed to determine that the client device successfully connected to the server from the kernel mode, determine that the client device did not successfully connect to the server from the user mode, and determine, based on the client device successfully connecting to the server from the kernel mode and failing to connect to the server from the user mode, that malware is blocking the connection from the client device to the server; and 5) a security module programmed to, in response to determining that the malware is blocking the connection from the client device to the server, perform at least one security action.

In some examples, the above-described method may be encoded as computer-readable instructions on a computer-readable-storage medium. For example, a non-transitory computer-readable medium may include one or more computer-executable instructions that, when executed by at least one processor of a computing device, cause the computing device to: 1) receive a request to determine whether a connection from a client device to a server is being blocked; 2) attempt to connect to the server from a kernel mode of the client device, the kernel mode of the client device providing kernel-level privileges to resources of the client device; 3) determine that the client device successfully connected to the server from the kernel mode; 4) attempt to connect to the server from a user mode of the client device, the user mode of the client device providing user-level privileges to the resources of the client device, the user level privileges being more limited than the kernel-level privileges; 5) determine that the client device did not successfully connect to the server from the user mode; 6) determine, based on the client device successfully connecting to the server from the kernel mode and failing to connect to the server from the user mode, that malware is blocking the connection from the client device to the server; and 7) in response to determining that the malware is blocking the connection from the client device to the server, perform at least one security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
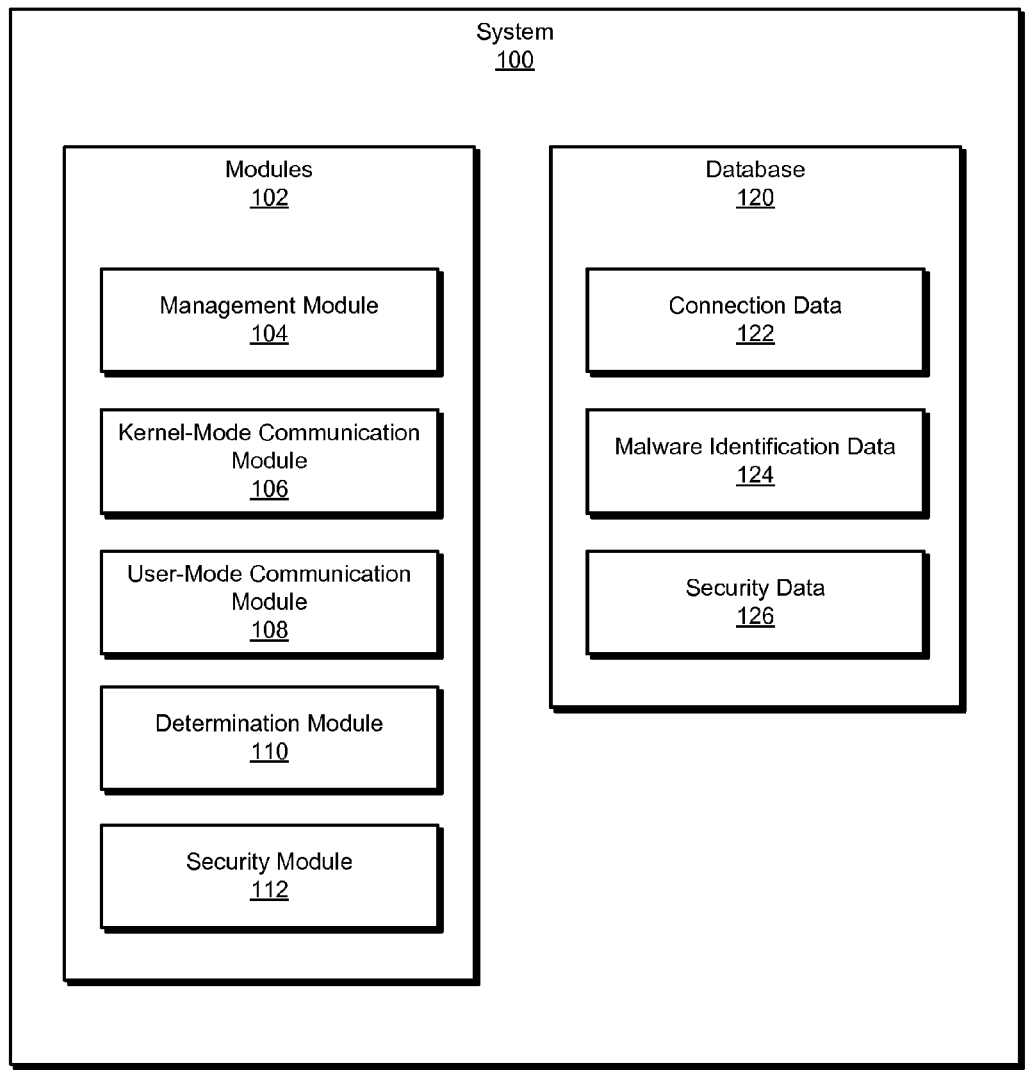
FIG. 1 is a block diagram of an exemplary system for detecting malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the instant disclosure are directed to detecting malware by attempting to connect to a server from both a kernel mode and a user mode of a client device. If a connection is successfully made from the kernel mode but not from the user mode, a malware detection system may determine that the client device is infected with malware that blocks user-mode connections between the client device and the server.

Figure 2:
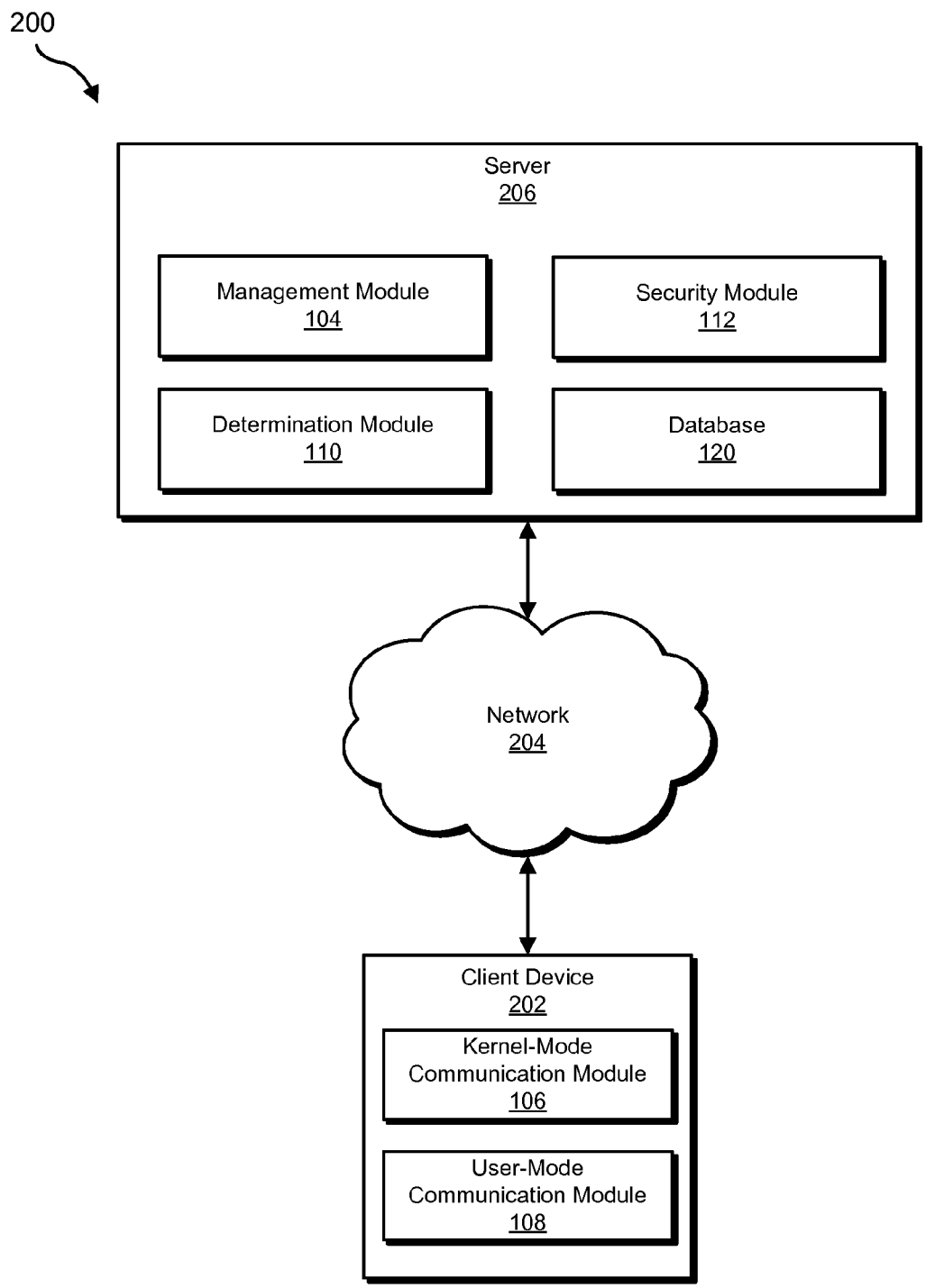
FIG. 2 is a block diagram of another exemplary system for detecting malware.

The following will provide, with reference to FIGS. 1-2, detailed descriptions of exemplary systems for detecting malware. Detailed descriptions of corresponding computer-implemented methods will also be provided in connection with FIG. 3. Detailed descriptions of an exemplary anti-malware system will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting malware. As illustrated in this figure, exemplary system 100 may include one or more modules 102 for performing one or more tasks. For example, and as will be explained in greater detail below, exemplary system 100 may include a management module 104 programmed to receive a request to determine whether a connection from a client device to a server is being blocked. Exemplary system 100 may also include a kernel-mode communication module 106 programmed to attempt to connect to the server from a kernel mode of the client device.

In addition, and as will be described in greater detail below, exemplary system 100 may include a user-mode communication module 108 programmed to attempt to connect to the server from a user mode of the client device. System 100 may also include a determination module 110 programmed to determine that the client device successfully connected to the server from the kernel mode, determine that the client device did not successfully connect to the server from the user mode, and determine, based on the client device successfully connecting to the server from the kernel mode and failing to connect to the server from the user mode, that malware is blocking the connection from the client device to the server. System 100 may further include a security module 112 programmed to perform at least one security action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store connection data 122, malware identification data 124, and security data 126. Connection data 122 may include data that indicates whether the kernel mode and/or user mode of the client device are able to connect to the server, malware identification data 124 may include signatures and/or other information useful in identifying malware, and security data 126 may include one or more security policies and/or information used to remove or otherwise remedy a malware infection.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client device 202 in communication with a server 206 via a network 204.

As shown, client device 202 may include kernel-mode communication module 106 and user-mode communication module 108. Server 206 may include management module 104, determination module 110, security module 112, and database 120. Kernel-mode communication module 106 and user-mode communication module 108 may attempt to make a connection from client device 202 to server 206 over network 204. Determination module 110 may determine whether the connections were successfully made. If kernel-mode communication module 106 successfully connects to server 206 and user-mode communication module 108 does not, determination module 110 may determine that malware is blocking connections between client device 202 and server 206.

While FIG. 2 shows management module 104, determination module 110, security module 112, and database 120 on server 206, one or more of these elements may be located on client device 202 and/or on a computing system remote from client device 202 and/or server 206.

Client device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of connecting to client device 202. Examples of server 206 include, without limitation, anti-virus servers, application servers, and/or database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections.

Figure 3:
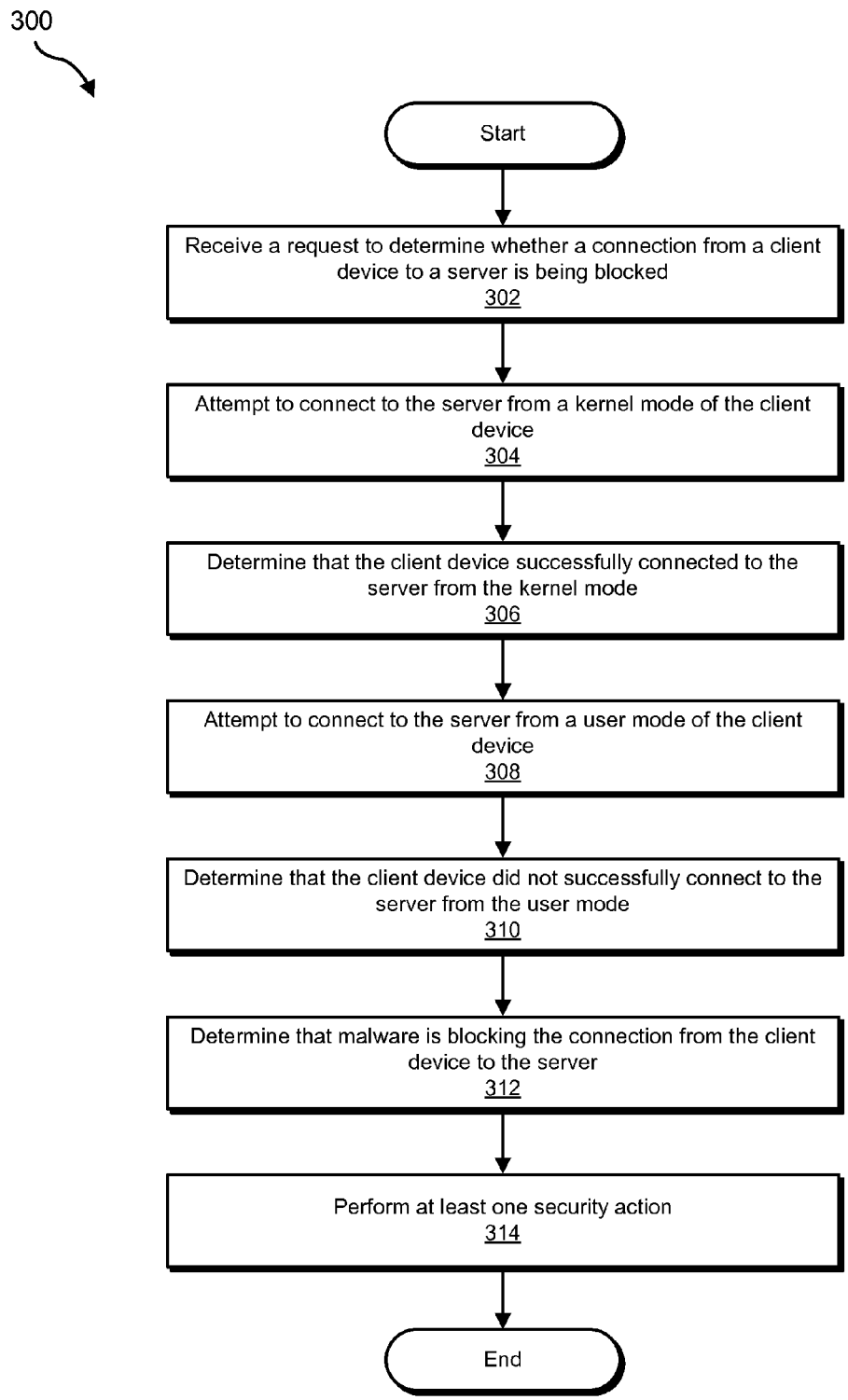
FIG. 3 is a flow diagram of an exemplary method for detecting malware.

FIG. 3 is a flow diagram of an exemplary computer-implemented method 300 for detecting malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

At step 302 in FIG. 3, one or more of the systems described herein may receive a request to determine whether a connection from a client device to a server is being blocked. For example, management module 104 in FIG. 1 (which may, as detailed above, represent a portion of server 206 in FIG. 2) may receive a request to determine whether a connection from client device 202 to server 206 is being blocked.

Management module 104 may be part of one or more of a variety of different systems. For example, management module 104 may be part of an anti-virus system that is attempting to determine whether an anti-virus agent on client device 202 is being blocked from receiving malware signature updates and/or other anti-virus information from server 206. Management module 104 may also be a part of any other type of anti-malware solution and/or other system that may receive a request to determine whether a connection from a client device to a server is being blocked.

Management module 104 may receive a request to determine whether a connection from a client device to a server is being blocked in various contexts. For example, management module 104 may receive a request to determine whether a connection from client device 202 to server 206 is being blocked as part of a periodically scheduled security scan, in response to a request initiated by an administrator or other user, in response to a request made over a network, and/or in response to any other type of request or triggering event.

At step 304 in FIG. 3, one or more of the systems described herein may attempt to connect to the server from a kernel mode of the client device. For example, kernel-mode communication module 106 (which may, as detailed above, represent a portion of system 100 in FIG. 1 and/or a portion of client device 202 in FIG. 2) may attempt to connect to server 206 from client device 202.

As used herein, the phrase "kernel mode" generally refers to any layer of privilege that provides more access to resources of a computing system than a user mode. Conversely, the phrase "user mode" generally refers to any layer of privilege that provides more limited access to resources of a computing system than a kernel mode.

Kernel modes and/or user modes may include levels within a hierarchical protection domain (also referred to as protection rings) that protect data and functionally of a computing system from malicious behavior and/or accidental modification. In some embodiments, kernel and user modes may be hardware-enforced Central Processing Unit (CPU) modes.

As noted above, a kernel mode may represent a level or layer of privilege with the architecture of a computing system that is higher than a level or layer of privilege of a user mode. The privileges associated with a kernel mode may specify the types of instructions and memory available to code running within the kernel mode. In some embodiments, code running in a kernel mode has full access (e.g., may be Ring 0 in a protection ring hierarchy) to every hardware resource (and/or a superset of hardware resources) of a computing system. For example, in WINDOWS operating systems, a WINDOWS kernel may run in Ring 0 (i.e., kernel mode). Processes that run in a kernel mode may have direct access to memory (e.g., random access memory in a kernel space and/or at a kernel level).

In contrast to a kernel mode, a user mode may provide more limited access to resources of a computing system (e.g., access to a subset of the resources available via the kernel mode). For example, processes that run in a user mode may not have direct access to memory. Instead, processes that run in a user mode may access memory indirectly (e.g., using virtual memory from a user space and/or user level instead of directly accessing physical memory). In some embodiments, a user mode may include Ring 3 (or one or more of Rings 1-3) in a protection ring hierarchy.

A user mode may be the normal mode of operation for most programs in an operating system. Programs and processes running in a user mode may not interact directly with an operating system kernel, while processes running in a kernel mode may interact directly with the kernel.

Kernel-mode communication module 106 may attempt to connect to server 206 in any suitable manner. For example, kernel-mode communication module 106 may attempt to connect to server 206 by attempting to open a network connection with server 206, by attempting to send a packet to any port of server 206 (e.g., by pinging server 206), by attempting to communicate with management module 104 on server 206, and/or by attempting to establish a connection with server 206 in any other suitable manner.

At step 306 in FIG. 3, one or more of the systems described herein may determine that the client device successfully connected to the server from the kernel mode. For example, determination module 110 (which may, as detailed above, form a part of system 100 in FIG. 1 and/or server 206 in FIG. 2) may determine that client device 202 successfully connected to server 206 from a kernel mode of client device 202.

Determination module 110 may determine that client device 202 successfully connected to server 206 in any suitable manner. For example, when located on server 206, determination module 110 may determine that client device 202 successfully connected to server 206 by identifying a data packet received from client device 202, by determining that client device 202 was able to receive an anti-virus update from server 206, and/or by otherwise determining that client device 202 opened a connection with server 206.

In some embodiments, determination module 110 may be located on client device 202 instead of server 206. In such embodiments, determination module 110 may determine that client device 202 successfully connected to server 206 by successfully pinging server 206, by receiving a message from server 206 that indicates successful connection with server 206, by receiving an update from server 206, and/or in any other suitable manner.

At step 308 in FIG. 3, one or more of the systems described herein may attempt to connect to the server from a user mode of the client device. For example, user-mode communication module 108 (which may, as detailed above, be a part of system 100 in FIG. 1 and/or client device 202 in FIG. 2) may attempt to connect to server 206 from a user mode of client device 202.

User-mode communication module 108 may attempt to connect to server 206 in any suitable manner. For example, user-mode communication module 108 may attempt to connect to server 206 by attempting to open a network connection with server 206, by attempting to send a packet to any port of server 206 (e.g., by pinging server 206), by attempting to communicate with management module 104 on server 206, and/or by attempting to establish a connection with server 206 in any other suitable manner.

At step 310 in FIG. 3, one or more of the systems described herein may determine that the client device did not successfully connect to the server from the user mode. For example, determination module 110 may determine that client device 202 did not successfully connect to server 206 from a user mode of client device 202.

Determination module 110 may determine that the client device 202 did not connect to server 206 from the user mode in any suitable manner. For example, when located on server 206, determination module 110 may fail to identify a data packet from a user mode of client device 202, may determine that client device 202 was unable to receive an anti-virus update, may determine that client device 202 could not open a connection with server 206 from the user mode, and/or may determine that client device 202 did not successfully connect to server 206 from the user mode in any other suitable manner.

As previously noted, determination module 110 may be located on client device 202 instead of server 206. In such embodiments, determination module 110 may determine that client device 202 did not successfully connect to server 206 by unsuccessfully pinging server 206 from the user mode, by determining that client device 202 failed to receive a message from server 206 that indicates successful connection with server 206 from the user mode, by determining that an expected update was not received from server 206, by receiving a connection failure message during the attempt to connect to server 206 from the user mode, and/or in any other suitable manner.

At step 312 in FIG. 3, one or more of the systems described herein may determine, based on the client device successfully connecting to the server from the kernel mode and failing to connect to the server from the user mode, that malware is blocking the connection from the client device to the server. For example, determination module 110 may determine that malware is blocking user-mode connections from client device 202 to server 206.

Determination module 110 may determine that malware is blocking user-mode connections between client device 202 and server 206 in a variety of manners. In some embodiments, determination module 110 may determine that malware is blocking user-mode connections based only on determining that client device 202 successfully connected to server 206 via a kernel mode and failed to connect to server 206 via a user mode. In other embodiments, determination module 110 may perform additional steps and/or analysis to determine whether client device 202 is infected with malware. For example, after determining that client device 202 successfully connected to server 206 via a kernel mode and failed to connect to server 206 via a user mode, determination module 110 may scan client device 202 for malware, may prompt an administrator to perform additional analysis on client device 202 to determine whether client device 202 is infected with malware, and/or may perform any other additional steps to further confirm that client device 202 is infected with malware that blocks user-mode connections to server 206.

As used herein, the term "malware" generally refers to any type or form of code programmed to disrupt or prevent normal operation of a computing system, collect secret information in a way that may lead to undesirable loss of the information, obtain unauthorized access to the resources of a system, and/or perform any other type of malicious behavior. Examples of malware include viruses, worms, Trojan horses, rootkits, spyware, botnets, keystroke loggers, and/or various other types of malicious code.

At step 314 in FIG. 3, one or more of the systems described herein may, in response to determining that malware is blocking the connection from the client device to the server, perform at least one security action. For example, security module 112 may, in response to determining that malware is blocking the connection from client device 202 to server 206, perform at least one security action.

Security module 112 may perform one or more of various types of security actions. For example, security module 112 may remove, from client device 202, the malware that is blocking the connection from client device 202 to server 206. Additionally or alternatively, security module 112 may notify an administrator and/or other computing system or software module of a potential malware infection on client device 202. In some embodiments, security module 112 may attempt to connect to client device 202 via an alternative server (e.g., other than server 206) that may not be blocked by the malware. If security module 112 is able to connect to client device 202 via the alternate server, security module 112 may provide client device 202 with updates and/or other tools that may be used to protect against and/or remove the malware. In other embodiments, instead of connecting to client device 202 through an alternate server, security module 112 may connect to client device 202 through the kernel mode of client device 202 to provide updates and/or other anti-malware tools to client device 202.

The steps shown in FIG. 3 may be performed in a variety of orders. For example, in some embodiments, step 308 may be performed before step 304 (i.e., the attempt to connect from the user mode may be made before the attempt to connect from the kernel mode). Alternatively, steps 304 and 308 may be performed concurrently.

Figure 4:
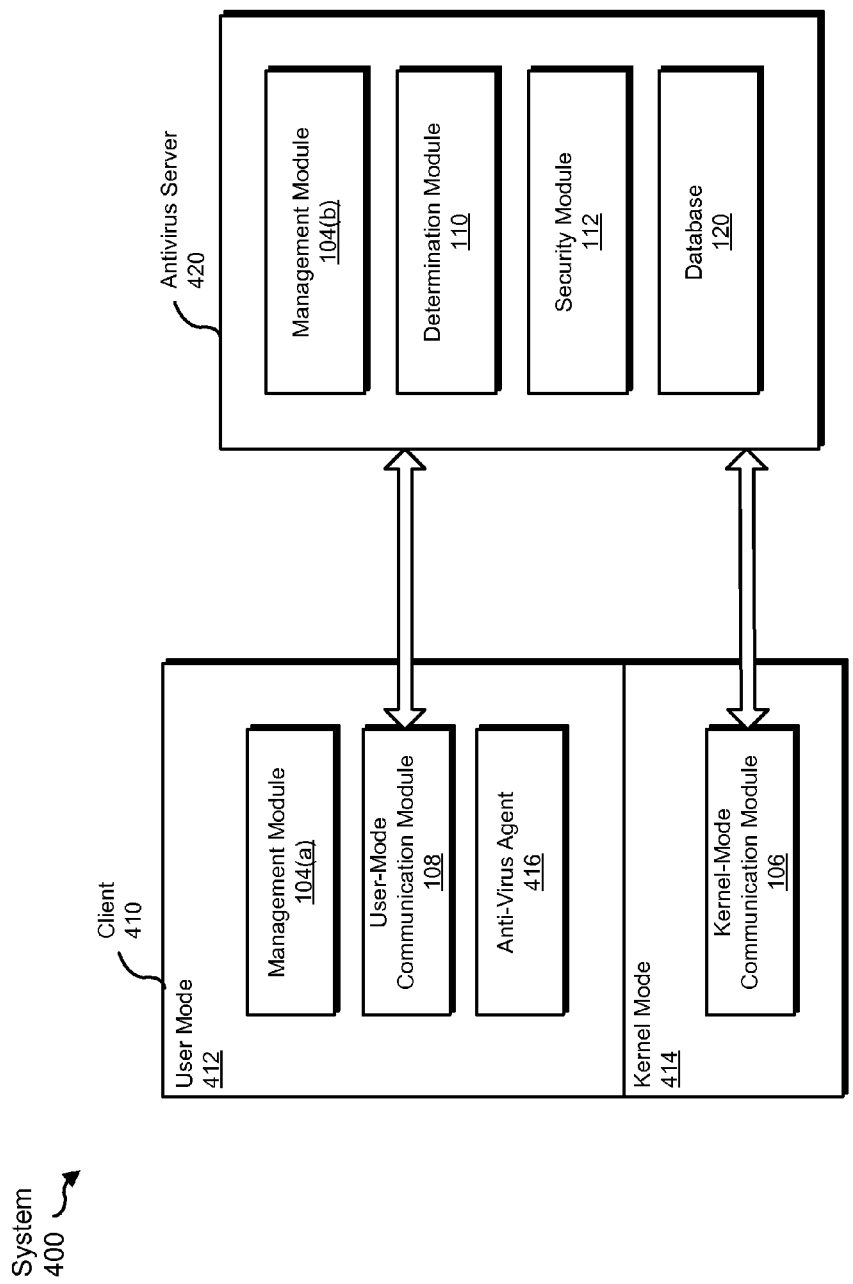
FIG. 4 is a block diagram of an exemplary anti-virus system for detecting malware.

FIG. 4 shows an exemplary anti-virus system 400 that implements embodiments of the instant disclosure. System 400 includes a client 410 in communication with an anti-virus server 420 over a network. Client 410 may include a user mode 412 and a kernel mode 414. User mode 412 may include user-mode communication module 108, an anti-virus agent 416, and a management module 104(*a*). Anti-virus agent 416 may be a locally installed agent (e.g., an anti-virus software program) of anti-virus server 420. In some embodiments, management module 104(*a*) may be part of anti-virus agent 416. Anti-virus server 420 may include management module 104(*b*) (in some embodiments, management of embodiments of the instant disclosure may be divided between a client and a server), determination module 110, security module 112, and database 120.

Management module 104(a) may receive a request to determine whether connections between client 410 and anti-virus server 420 are being blocked. Management module 104(a) may then attempt to connect to anti-virus server 420 via user-mode communication module 108. Management module 104(a) may also attempt to connect to anti-virus server 420 via kernel-mode communication module 106. In some embodiments, kernel-mode communication module 106 may be a kernel-level network driver (or any other suitable kernel-mode software component). In such embodiments, rather than switching to kernel mode 414, management module 104(a) may attempt to connect to anti-virus server 420 through kernel mode 414 by invoking the kernel-level driver (i.e., kernel-mode communication module 106). Similarly, user-mode communication module 108 may be a user level network communication driver (or any other suitable user-mode component), and management module 104 (a) may also attempt to connect to anti-virus server 420 through this user-level network communication driver. In other words, embodiments of the instant disclosure may use network drivers in a user mode (e.g, a version 3 driver) and a kernel mode (e.g., a version 2 driver) to attempt to connect to a server. In other words, in the example given above, a version 3 network driver may be used to attempt the connection via user mode 412 and a version 2 driver may be used to attempt the connection via kernel mode 414.

Alternatively, management module 104(a) may cause client 410 to switch between user mode 412 and kernel mode 414 to attempt connecting to anti-virus server 420 from user mode 412 and kernel mode 414 of client 410. For example, after attempting to connect to anti-virus server 420 from the kernel mode 414 and before attempting to connect to anti-virus server 420 from user mode 412, management module 104(a) may switch client device 412 from kernel mode 414 to user mode 412.

Management module 104(a) may switch between user mode 412 and kernel mode 414 in a variety of different ways. For example, management module 104(a) may trigger an interrupt to switch from user mode 412 into kernel mode 414. A return from the interrupt may switch back from kernel mode 414 to user mode 412.

After an attempt to connect to anti-virus server 420 has been made from either user mode 412 of client 410 or kernel mode 414 of client 410, determination module 110 may determine whether the connection attempt (or attempts) was successful. In some embodiments, management module 104(a) may first attempt to connect to anti-virus server 420 via user mode 412. If determination module 110 determines that client 410 is able to connect to anti-virus server 420 via user mode 412, determination module 110 may determine that client 410 is not infected with blocking malware and may not perform any further analysis (e.g., may not attempt to connect to anti-virus server 420 via kernel mode 414).

In other embodiments, management module 104(a) may first attempt to connect to anti-virus server 420 via kernel mode 414. If determination module 110 determines that client 410 is not able to connect to anti-virus server 420 via kernel mode 414, determination module 110 may determine that client 410 cannot connect to sever 420 for legitimate reasons (e.g., client 410 may be offline, server 420 may be offline, a network connection between client 410 and server 420 may be down, etc.) and may not perform any further analysis (e.g., may not attempt to connect to anti-virus server 420 via user mode 412).

On the other hand, if determination module 110 determines that client 410 is able to connect to server 420 via kernel mode 414 but not via user mode 412, determination module 110 may determine that client 410 is infected with malware that blocks user mode connections between client 410 and server 420. In response to such a determination, security module 112 may perform one or more security actions, as discussed in detail above.

Figure 5:
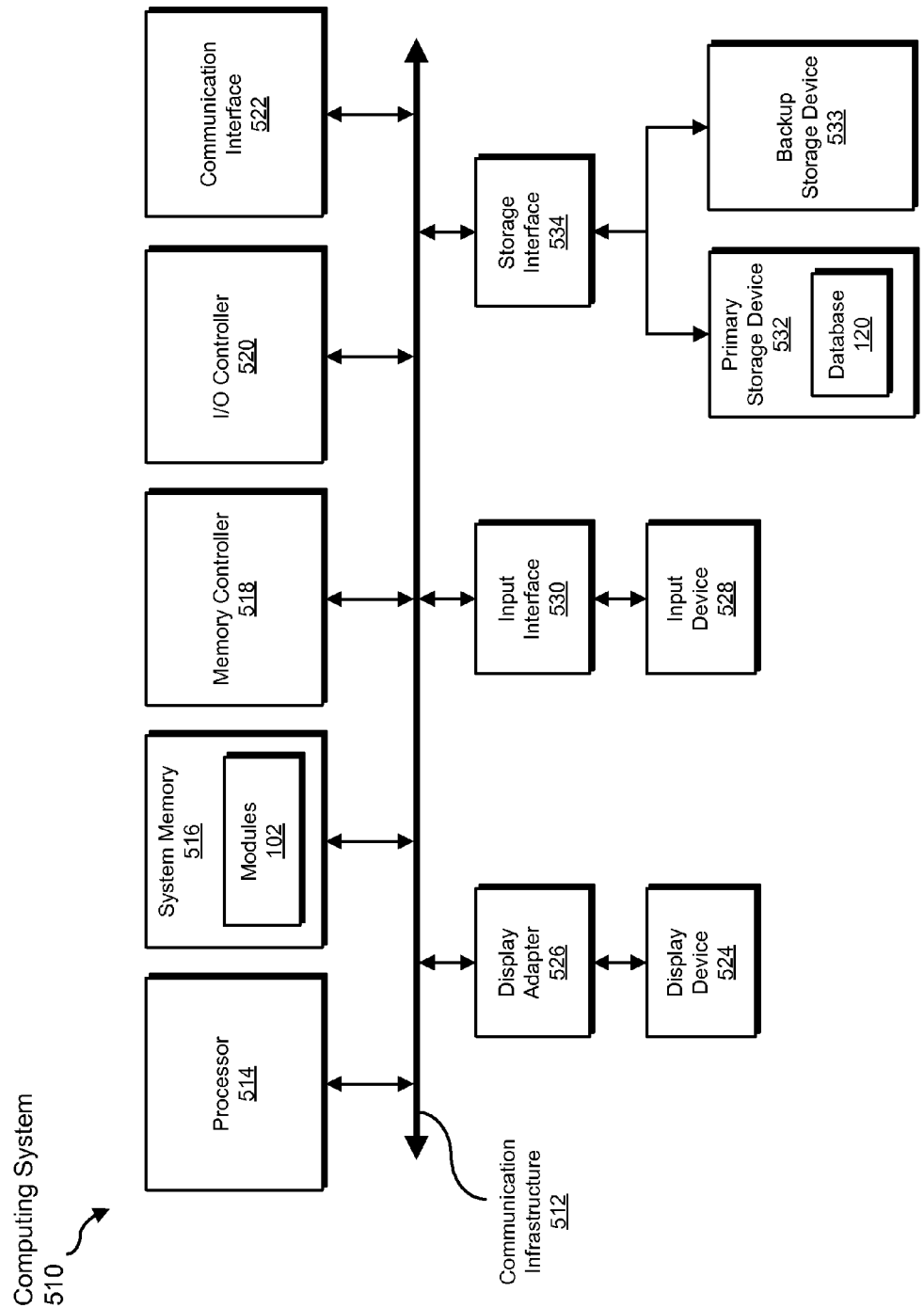
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the receiving, attempting, determining, performing, and/or switching steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
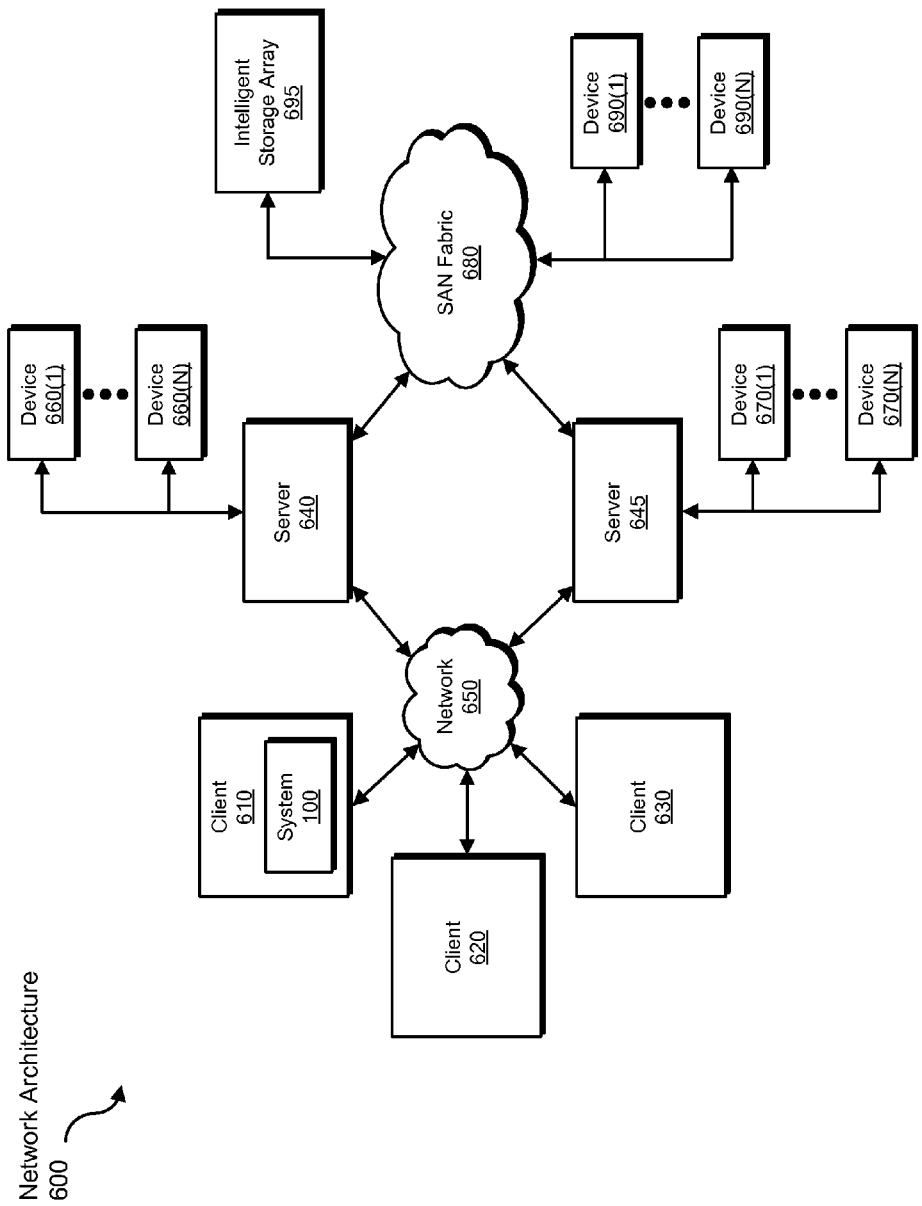
FIG. 6 is a block diagram of an exemplary computing network capable of implementing one or more of the embodiments described and/or illustrated herein.

FIG. 6 is a block diagram of an exemplary network architecture 600 in which clients 610, 620, and 630 and servers 640 and 645 may be coupled to a network 650. As detailed above, all or a portion of network architecture 600 may perform and/or be a means for performing, either alone or in combination with other elements, one or more of the receiving, attempting, determining, performing, and/or switching steps disclosed herein. All or a portion of network architecture 600 may also be used to perform and/or be a means for performing other steps and features set forth in the instant disclosure.

Clients 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, clients 610, 620, and/or 630 and/or servers 640 and/or 645 may include all or a portion of system 100 from FIG. 1.

As illustrated in FIG. 6, one or more devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between clients 610, 620, and 630 and storage devices 690(1)-(N) and/or intelligent storage array 695 in such a manner that devices 690(1)-(N) and intelligent storage array 695 appear as locally attached devices to clients 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client 610, 620, and 630 and network 650. Clients 610, 620, and 630 may be able to access information on server 640 or 645 using, for example, a web browser or other client software. Such software may allow clients 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to clients 610, 620, and 630 over network 650.

As detailed above, computing system 510 and/or one or more components of network architecture 600 may perform and/or be a means for performing, either alone or in combination with other elements, one or more steps of an exemplary method for detecting malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a blocked computing system into a malware detection system by sending user-mode and kernel-mode communication from the computing system to a server.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malware, at least a portion of the method being performed by a computing system comprising at least one processor, the method comprising:
   receiving a request to determine whether a connection from a client device to a server is being blocked;
   attempting to connect to the server from a kernel mode of the client device, the kernel mode of the client device providing kernel-level privileges to resources of the client device;
   determining that the client device successfully connected to the server from the kernel mode;
   attempting to connect to the server from a user mode of the client device, the user mode of the client device providing user-level privileges to the resources of the client device, the user-level privileges being more limited than the kernel-level privileges;
   determining that the client device did not successfully connect to the server from the user mode;
   determining, based on the client device successfully connecting to the server from the kernel mode and failing to connect to the server from the user mode, that malware is blocking the connection from the client device to the server;
   in response to determining that the malware is blocking the connection from the client device to the server, performing at least one security action.

2. The computer-implemented method of claim 1, wherein:
   the kernel mode of the client device provides direct access to random access memory of the client device;
   the user mode of the client device provide virtual access, instead of direct access, to the random access memory of the client device.

3. The computer-implemented method of claim 1, wherein:
   attempting to connect to the server from the kernel mode of the client device comprises calling a kernel-mode network driver of the client device.

4. The computer-implemented method of claim 1, further comprising:
   after attempting to connect to the server from the kernel mode of the client device and before attempting to connect to the server from the user mode of the client device, switching the client device from the kernel mode to the user mode.

5. The computer-implemented method of claim 1, wherein:
   determining that the malware is blocking the connection from the client device to the server comprises determining that the malware is running in the user mode and is blocking attempts to connect to the server via the user mode.

6. The computer-implemented method of claim 1, wherein:
   performing the security action comprises removing the malware from the client device.

7. The computer-implemented method of claim 1, wherein:
   the server comprises an anti-virus system backend;
   the client device comprises an anti-virus agent that communicates with the anti-virus system backend to protect the client device from viruses.

8. A system for detecting malware, the system comprising:
   a management module programmed to receive a request to determine whether a connection from a client device to a server is being blocked;
   a kernel-mode communication module programmed to attempt to connect to the server from a kernel mode of the client device, the kernel mode of the client device providing kernel-level privileges to resources of the client device;
   a user-mode communication module programmed to attempt to connect to the server from a user mode of the client device, the user mode of the client device providing user-level privileges to the resources of the client device, the user-level privileges being more limited than the kernel-level privileges;
   a determination module programmed to:
      determine that the client device successfully connected to the server from the kernel mode;
      determine that the client device did not successfully connect to the server from the user mode;
      determine, based on the client device successfully connecting to the server from the kernel mode and failing to connect to the server from the user mode, that malware is blocking the connection from the client device to the server;
   a security module programmed to, in response to determining that the malware is blocking the connection from the client device to the server, perform at least one security action;
   one or more processors configured to execute the management module, the kernel-mode communication module, the user-mode communication module, the determination module, and the security module.

9. The system of claim 8, wherein:
   the kernel mode of the client device provides direct access to random access memory of the client device;
   the user mode of the client device provide virtual access, instead of direct access, to the random access memory of the client device.

10. The system of claim 8, wherein:
    the kernel-mode communication module attempts to connect to the server from the kernel mode of the client device by calling a kernel-mode network driver of the client device.

11. The system of claim 8, further comprising:
    a mode-switching module programmed to, after attempting to connect to the server from the kernel mode of the client device and before attempting to connect to the server from the user mode of the client device, switch the client device from the kernel mode to the user mode.

12. The system of claim 8, wherein:
    the determination module is programmed to determine that the malware is blocking the connection from the client device to the server by determining that the malware is running in the user mode and is blocking attempts to connect to the server via the user mode.

13. The system of claim 8, wherein:
    the security module is programmed to perform the security action by removing the malware from the client device.

14. The system of claim 8, wherein:

the server comprises an anti-virus system backend;

the client device comprises an anti-virus agent that communicates with the anti-virus system backend to protect the client device from viruses.

15. A non-transitory computer-readable medium comprising one or more computer-executable instructions that, when executed by at least one processor of a computing device, cause the computing device to:

receive a request to determine whether a connection from a client device to a server is being blocked;

attempt to connect to the server from a kernel mode of the client device, the kernel mode of the client device providing kernel-level privileges to resources of the client device;

determine that the client device successfully connected to the server from the kernel mode;

attempt to connect to the server from a user mode of the client device, the user mode of the client device providing user-level privileges to the resources of the client device, the user level privileges being more limited than the kernel-level privileges;

determine that the client device did not successfully connect to the server from the user mode;

determine, based on the client device successfully connecting to the server from the kernel mode and failing to connect to the server from the user mode, that malware is blocking the connection from the client device to the server;

in response to determining that the malware is blocking the connection from the client device to the server, perform at least one security action.

16. The non-transitory computer-readable medium of claim 15, wherein:

the kernel mode of the client device provides direct access to random access memory of the client device;

the user mode of the client device provides virtual access, instead of direct access, to the random access memory of the client device.

17. The non-transitory computer-readable medium of claim 15, wherein:

the one or more computer-executable instructions are programmed to attempt to connect to the server from the kernel mode of the client device by calling a kernel-mode network driver of the client device.

18. The non-transitory computer-readable medium of claim 15, wherein the one or more computer-executable instructions are further programmed to:

after attempting to connect to the server from the kernel mode of the client device and before attempting to connect to the server from the user mode of the client device, switch the client device from the kernel mode to the user mode.

19. The non-transitory computer-readable medium of claim 15, wherein:

the one or more computer-executable instructions are programmed to determine that the malware is blocking the connection from the client device to the server by determining that the malware is running in the user mode and is blocking attempts to connect to the server via the user mode.

20. The non-transitory computer-readable medium of claim 15, wherein:

the one or more computer-executable instructions are programmed to perform the security action by removing the malware from the client device.

\* \* \* \* \*

UNITED STATES PATENT AND TRADEMARK OFFICE
CERTIFICATE OF CORRECTION

PATENT NO. : 8,402,539 B1
APPLICATION NO. : 13/227997
DATED : March 19, 2013
INVENTOR(S) : Joseph Chen, Adam Glick and Jeffrey Wilhelm Page 1 of 1

It is certified that error appears in the above-identified patent and that said Letters Patent is hereby corrected as shown below:

In the Claims

Claim 2, at column 15, lines 45 to 47, should read:

the user mode of the client device provides virtual access, instead of direct access, to the random access memory of the client device.

Claim 9, at column 16, lines 42 to 44, should read:

the user mode of the client device provides virtual access, instead of direct access, to the random access memory of the client device.

Signed and Sealed this
Twenty-third Day of July, 2013

Teresa Stanek Rea
*Acting Director of the United States Patent and Trademark Office*